US007726181B2

(12) United States Patent
Iwata et al.

(10) Patent No.: US 7,726,181 B2
(45) Date of Patent: Jun. 1, 2010

(54) IGNITION TIMING MEASURING AND DISPLAY DEVICE OF INTERNAL COMBUSTION ENGINE

(75) Inventors: Masao Iwata, Yokosuka (JP); Fumitake Matsuda, Yokosuka (JP); Toshiyuki Takano, Yokosuka (JP); Atsushi Kawahara, Yokosuka (JP)

(73) Assignee: Oppama Industry Co., Ltd., Kanagawa (JP)

( * ) Notice: Subject to any disclaimer, the term of this patent is extended or adjusted under 35 U.S.C. 154(b) by 280 days.

(21) Appl. No.: 11/887,430

(22) PCT Filed: Apr. 6, 2006

(86) PCT No.: PCT/JP2006/307326

§ 371 (c)(1),
(2), (4) Date: Sep. 28, 2007

(87) PCT Pub. No.: WO2006/109669

PCT Pub. Date: Oct. 19, 2006

(65) Prior Publication Data

US 2009/0133482 A1 May 28, 2009

(30) Foreign Application Priority Data

Apr. 11, 2005 (JP) ............................ 2005-113184

(51) Int. Cl.
*G01M 15/05* (2006.01)

(52) U.S. Cl. .................................................. 73/114.63

(58) Field of Classification Search .............. 73/114.58, 73/114.62, 114.63, 114.64, 114.65
See application file for complete search history.

(56) References Cited

U.S. PATENT DOCUMENTS 4,367,531 A * 1/1983 Furuhashi et al. ........... 701/111
4,425,891 A * 1/1984 Kashimura et al. ..... 123/406.16
4,463,729 A 8/1984 Bullis
4,583,175 A * 4/1986 Abe et al. .................. 701/111

(Continued)

FOREIGN PATENT DOCUMENTS

EP 0 071 557 A2 2/1983

(Continued)

OTHER PUBLICATIONS

Translation of the International Preliminary Report on Patentability.

*Primary Examiner*—Eric S McCall
(74) *Attorney, Agent, or Firm*—Pillsbury Winthrop Shaw Pittman, LLP

(57) ABSTRACT

An ignition timing measuring and display device of an internal combustion engine (1) having a magneto (A) includes a reference RPM signal pulse detector (2) for detecting a reference RPM signal pulse of the internal combustion engine (1) and an ignition noise pulse detector (4) for detecting ignition noise of an electromagnetic wave generated in the vicinity of an ignition plug (3) when ignition is carried out in the internal combustion engine (1) and calculates ignition timing generated by the magneto (A) based on the signal pulse and the ignition noise pulse and displays it. Since the ignition timing of the internal combustion engine can be easily monitored, maintenance can be carried out to the internal combustion engine and an ignition device to realize a necessary operating performance of the internal combustion engine.

6 Claims, 2 Drawing Sheets

U.S. PATENT DOCUMENTS 4,587,838 A * 5/1986 Sakai et al. .............. 73/116.01
4,887,215 A * 12/1989 Kumagai et al. ............ 701/102
5,537,855 A * 7/1996 Hunninghaus et al. ..... 73/35.05

FOREIGN PATENT DOCUMENTS

JP 52-47145 4/1977
JP 58-25584 A 2/1983
JP 8-177600 7/1996
JP 8-177701 7/1996

* cited by examiner

IGNITION TIMING MEASURING AND DISPLAY DEVICE OF INTERNAL COMBUSTION ENGINE

TECHNICAL FIELD

The present invention relates to ignition timing measuring and display device of an internal combustion engine capable of measuring ignition timing of an internal combustion engine having a magneto (magneto generator type ignition device) and displaying a measured value of the timing.

BACKGROUND ART

A performance of an internal combustion engine having a magneto for a work machine such as a chain saw, a grass mover, and the like depends on how combustion is achieved under environmental conditions.

Accordingly, to achieve an output of a predetermined level, better fuel consumption, and reduction of exhausted substances, it is preferable to derive a particular engine performance by adjusting, for example, an air/fuel ratio to a value apart from a theoretical air/fuel ratio. Further, when it is possible to find ignition timing at a rotation angle of a crank before a piston reaches an upper dead point of a compression stroke, ordinary users can carry out maintenance for reducing the fuel consumption and the exhausted substances and enhancing the engine output.

DISCLOSURE OF THE INVENTION

Ignition timing of ordinary internal combustion engines is fixedly determined by data previously designed by engine manufactures and the like. Further, heretofore, there is not any method of monitoring ignition timing except a method of monitoring it in an engine from which a cover is removed with a timing light in, for example, a service factory located in a special environment. Thus, actually, ordinary users cannot monitor ignition timing from the outside of an internal combustion engine.

Further, in a work machine such as a grass mover and the like, there is a case in which it is desired to determine that a coil of an ignition controller of an internal combustion engine fails (When, for example, engine rotates at 7000 RPM, if ignition timing set to 25° in front of an upper dead point changes to 30° in front of it, it is determined that an abnormal state occurs). Heretofore, no work machines with an arrangement for confirming ignition timing are proposed.

An object of the present invention, which was made in view of the conventional problems described above, is to provide an ignition timing measuring and display device of an internal combustion engine which permits ordinary users to monitor ignition timing of the internal combustion engine so that they can carry out necessary maintenance and the like to the internal combustion engine and an ignition device to realize an operation performance of the internal combustion engine.

To achieve the above object, an ignition timing measuring and display device of an internal combustion engine having a magneto according to an invention of claim 1 is characterized by including a reference RPM signal pulse detector for detecting a reference RPM signal pulse of the internal combustion engine, and an ignition noise pulse detector for detecting ignition noise of an electromagnetic wave generated in the vicinity of an ignition plug when ignition is carried out in the internal combustion engine, wherein ignition timing generated by the magneto can be subjected to an arithmetic operation based on the signal pulse and the ignition noise pulse and displayed.

With this arrangement, maintenance necessary to the internal combustion engine and an ignition device can be carried out by calculating ignition timing by carrying out a simple arithmetic operation based on the reference RPM signal pulse of the internal combustion engine having the magneto and the ignition noise pulse of the electromagnetic wave generated in the vicinity of the ignition plug when the ignition is carried out in the internal combustion engine and displaying the ignition timing.

An ignition timing measuring and display device of an internal combustion engine having a magneto according to an invention of claim 2 is characterized in that the reference RPM signal pulse of the internal combustion engine is a voltage pulse induced by a generator coil of the magneto.

Ignition timing of the internal combustion engine can be determined by carrying out a simple arithmetic operation process based on the voltage pulse induced by the generator coil of the magneto used as the reference RPM signal pulse of the internal combustion engine and on the ignition noise pulse of the electromagnetic wave generated in the vicinity of the ignition plug when the ignition is carried out in the internal combustion engine.

An ignition timing measuring and display device of an internal combustion engine having a magneto according to an invention of claim 3 is characterized in that the reference RPM signal pulse of the internal combustion engine is a voltage pulse induced to a primary coil of an ignition coil of the magneto.

Ignition timing of the internal combustion engine can be determined by carrying out a simple arithmetic operation process based on the voltage pulse induced to the primary coil of the ignition coil of the magneto used as the reference RPM signal pulse of the internal combustion engine and on the ignition noise pulse of the electromagnetic wave generated in the vicinity of the ignition plug when the ignition is carried out in the internal combustion engine.

An ignition timing measuring and display device of an internal combustion engine having a magneto according to an invention of claim 4 is characterized in that the reference RPM signal pulse of the internal combustion engine is an output pulse of an optical sensor, a magnetic sensor, and the like for detecting RPM of the internal combustion engine.

Ignition timing of the internal combustion engine can be determined by carrying out a simple arithmetic operation process based on the output pulse of the optical sensor, the magnetic sensor, and the like for detecting the RPM of the internal combustion engine used as the reference RPM signal pulse of the internal combustion engine and on the ignition noise pulse of the electromagnetic wave generated in the vicinity of the ignition plug when the ignition is carried out in the internal combustion engine.

An ignition timing measuring and display device of an internal combustion engine having a magneto according to an invention of claim 5 is characterized in that, in the arithmetic operation of the ignition timing, time T per reference angle is determined from a cycle T1 of the reference RPM signal pulse, and a value obtained by dividing a time T2, which passed from the time at which the signal pulse was generated to the time at which the ignition noise pulse of the electromagnetic wave was generated for the first time after the signal pulse was generated, by the time is determined as ignition timing.

With this arrangement, the ignition timing, which is determined based on the reference RPM signal pulse of the internal combustion engine and the pulse of the electromagnetic wave can be measured and displayed with pinpoint accuracy by the arithmetic operation.

An ignition timing measuring and display device of an internal combustion engine having a magneto according to an invention of claim 6 is characterized in that a constant corresponding to ignition timing inherent to an internal combustion engine which is different in each of work machines is set, and ignition timing determined by the arithmetic operation based on the set constant is displayed.

With this arrangement, since the ignition timing can be measured and displayed with pinpoint accuracy by the ignition timing inherent to the internal combustion engine and the arithmetic operation process, a user can carry out maintenance to the internal combustion engine and the ignition device in operation according to fuel consumption and an engine output state in a predetermined environment while observing ignition timing displayed on the display device.

According to the present invention, the ignition timing generated by the magneto is determined by the reference RPM signal pulse and the ignition noise pulse and displayed. As a result, a user and the like can monitor fuel consumption and an engine output of an internal combustion engine in operation by observing the ignition timing as well as can use the ignition timing as data for checking a state of a generator coil and for carrying out maintenance to the internal combustion engine, an ignition device, and the like.

BEST MODE FOR CARRYING OUT THE INVENTION

Figure 1:
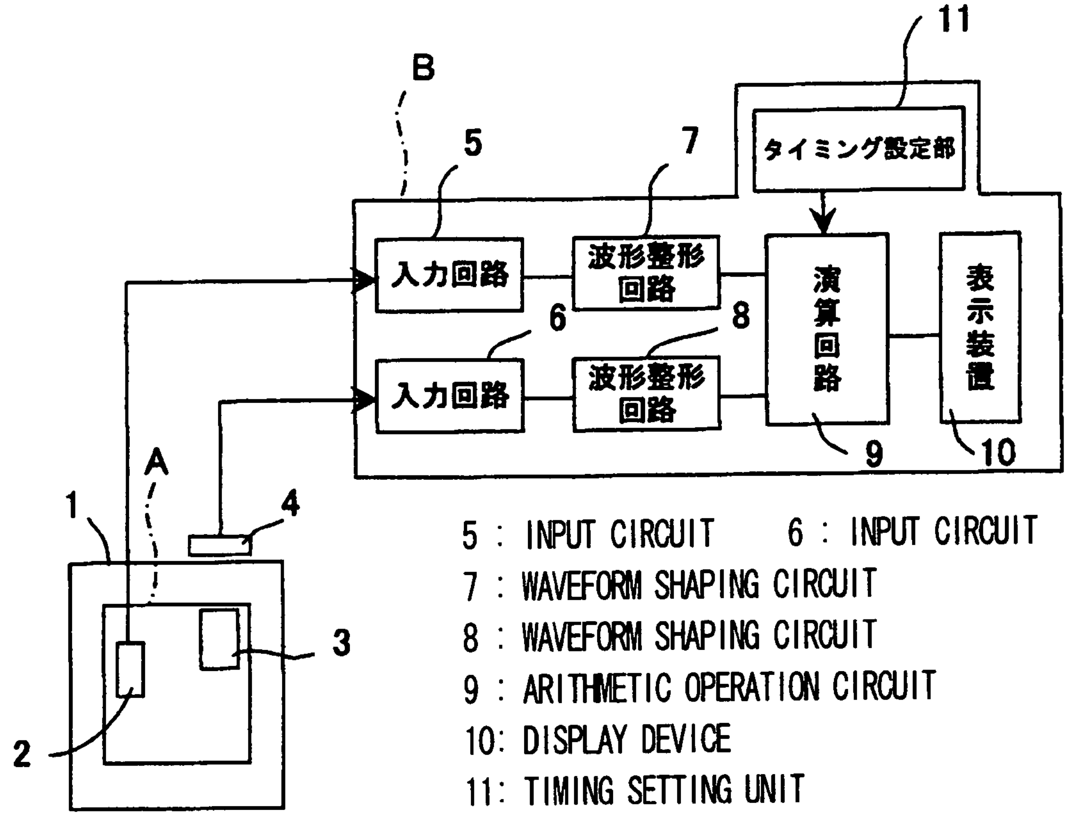
FIG. 1 is an arrangement view showing ignition timing measuring and display device of an internal combustion engine according to an embodiment of the present invention.

An ignition timing measuring and display device of an internal combustion engine according to an embodiment of the present invention will be explained below with reference to the drawings. FIG. 1 is an arrangement view showing the ignition timing measuring device of the internal combustion engine having a magneto A according to the embodiment of the present invention.

In FIG. 1, the internal combustion engine 1 has the magneto A, and the magneto A includes a reference RPM signal pulse detector 2 and an ignition plug 3 of the internal combustion engine. An ignition noise detector 4 is disposed in the vicinity of the ignition plug 3.

The reference RPM signal pulse detector 2 is connected to an input circuit 5, and the ignition noise pulse detector 4 is connected to an input circuit 6, and these input circuits 5, 6 constitute ignition timing measuring device B. Further, an arithmetic operation circuit 9 and a display device 10 are connected to the input circuits 5, 6 through waveform shaping circuits 7, 8, respectively. Further, a timing setting unit 11 is connected to the arithmetic operation circuit 9 to set ignition timing inherent to the internal combustion engine.

Next, operation of the ignition timing measuring device arranged as described above will be explained. First, when the internal combustion engine is driven, a generator coil of the magneto A induces a voltage pulse, and the reference RPM signal pulse detector 2 outputs the voltage pulse as a reference RPM signal pulse as shown in a part (*a*) of FIG. 2.

The input circuit 5 subjects the reference RPM signal pulse to waveform shaping through the waveform shaping circuit 7 and then inputs it to the arithmetic operation circuit 9.

Figure 2:
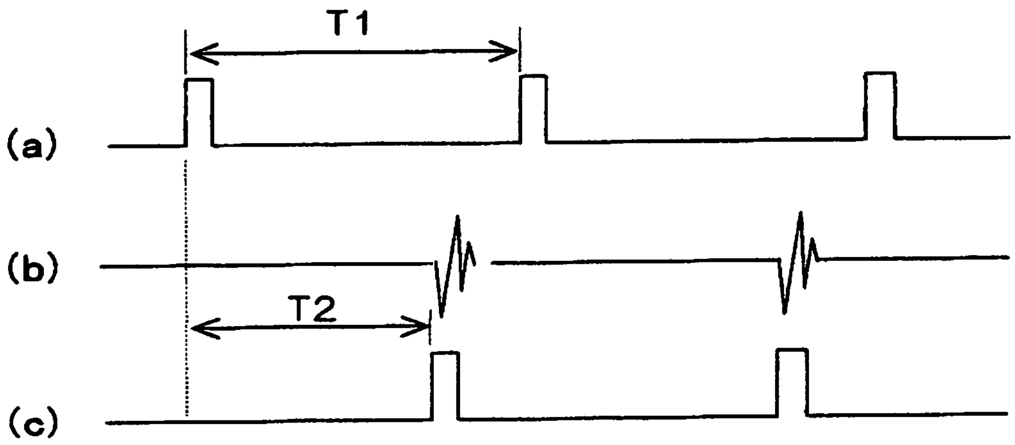
FIG. 2 is a timing chart showing signal waveforms of respective portions of a circuit shown in FIG. 1.

In contrast, the ignition noise pulse detector 4 inputs an ignition noise pulse, which is generated by the ignition plug 3 and shown in a part (*b*) of FIG. 2, to the input circuit 6. The ignition noise pulse is subjected to waveform shaping by the waveform shaping circuit 8 as shown in a part (*c*) of FIG. 2 and input to the arithmetic operation circuit 9.

The arithmetic operation circuit 9 determines time T per reference angle (for example, 1°) from a cycle T1 of the reference RPM signal pulse. Further, a time T2, which passed from the time at which the reference RPM signal pulse was generated to the time at which the ignition noise pulse was generated for the first time after the reference RPM signal pulse was generated is measured, and ignition timing is determined by dividing the time T2 by the above time T. The ignition timing determined as described above can be displayed on the display device 10.

In this case, when a constant corresponding to ignition timing inherent to an internal combustion engine which is different in each of work machines, it is possible to display the thus set constant and the ignition timing, which is determined by the arithmetic operation, on the display device 10 in correspondence to each other.

Note that although the above mentioned is a case in which the reference RPM signal pulse of the internal combustion engine is obtained from the voltage pulse induced by the generator coil, it can be also obtained from a voltage pulse induced to a primary coil of an ignition coil of the magneto A and further from a pulse output from an optical sensor, a magnetic sensor, and the like for detecting RPM of the internal combustion engine.

Further, in the embodiment, ignition timing can be optionally set from the timing setting unit 11 to the arithmetic operation circuit 9 referring to the ignition timing displayed on the display device 10.

Figure 3:
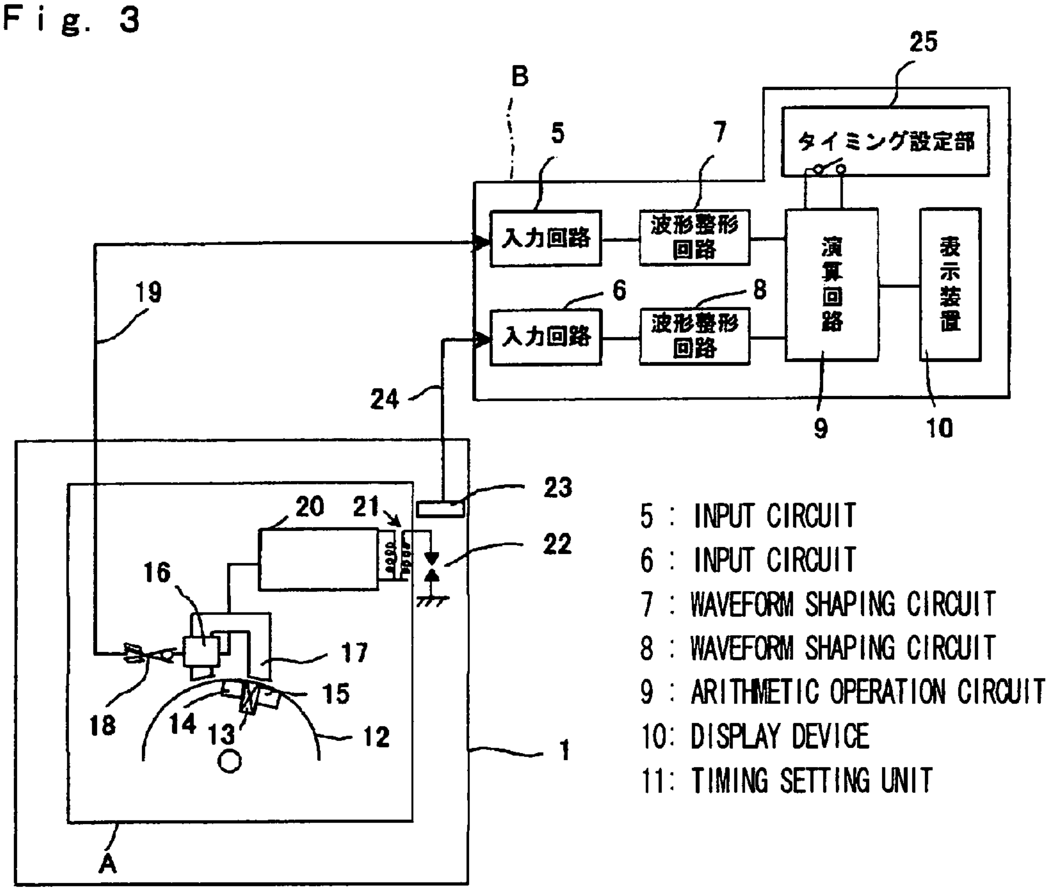
FIG. 3 is an arrangement view showing ignition timing measuring and display device of an internal combustion engine according to another embodiment of the present invention.

FIG. 3 shows another embodiment of the present invention. In a magneto A of the embodiment, two magnetic poles 14, 15 are disposed across a magnet 13 in an outer peripheral portion of a rotor 12, and a leg of a core 17 around which a generator coil 16 is wound is disposed so as to face the outer periphery of the rotor 12.

A stop terminal of the generator coil 16 is clamped by a clip 18 and supplies a voltage pulse induced by the generator coil 16 is supplied to the input circuit 5 through a lead 19.

In contrast, an ignition coil 21 is connected to the generator coil 16 through an ignition control circuit 20 including a switch device such as a charge/discharge capacitor, a thyristor, and the like.

An ignition plug 22 is connected to a secondary coil of the ignition coil 21, and an antenna 23 is disposed in the vicinity of the ignition plug 22 to detect an ignition noise pulse of an electromagnetic wave generated when ignition is carried out. The ignition noise pulse is input to the input circuit 6 through a lead 24.

Further, a timing setting unit 25 composed of an on/off switch and a rotary switch is connected to the arithmetic operation circuit 9 so that a user selects and sets arbitrary ignition timing.

Figure 4:
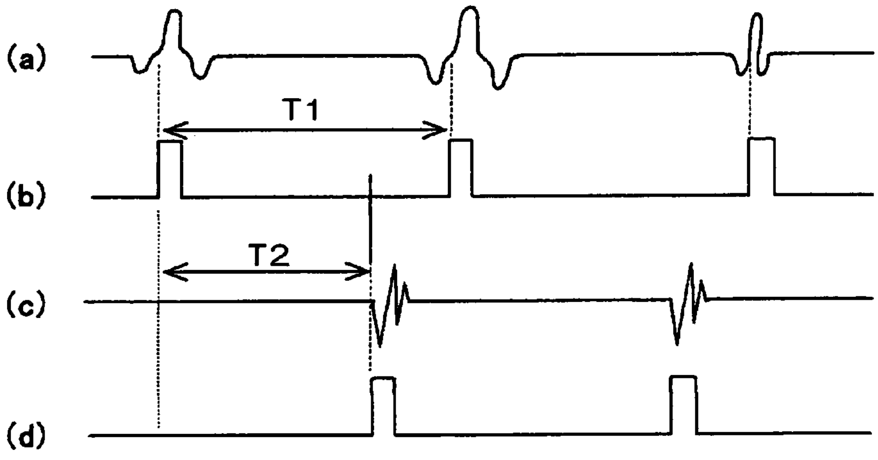
FIG. 4 is a timing chart showing signal waveforms of respective portions of a circuit shown in FIG. 3.

In the embodiment, a voltage, which is generated by the generator coil 16 and shows in a part (*a*) of FIG. 4, is input to the input circuit 5 through the clip 18 and the lead 19. The voltage is subjected to waveform shaping by the waveform shaping circuit 7, and a pulse as shown in a part (*b*) of FIG. 4 is obtained as a reference RPM signal pulse.

In contrast, the antenna 23 captures an electromagnetic wave generated from the vicinity of the ignition plug 22 when ignition is carried out, converts the wave into a voltage pulse shown in a part (*c*) of FIG. 4, and supplies it to the input circuit 6 through the lead 24. The waveform shaping circuit 8 subjects the voltage pulse to waveform shaping and makes it to an ignition pulse shown in a part (d) of FIG. 4.

The arithmetic operation circuit 9 subjects the reference RPM signal pulse and the ignition noise pulse to an arithmetic operation by a procedure similar to the above procedure. That is, the arithmetic operation circuit 9 determines time T per reference angle from a cycle T1 of the reference RPM signal pulse and determines a value obtained by dividing a time T2 which, passed from a time at which the reference RPM signal pulse was generated to a time at which the ignition noise pulse was generated for the first time after the reference RPM signal pulse was generated, by the time T as ignition timing.

As described above, according to the embodiment, ignition timing of an internal combustion engine can be arbitrarily displayed together with a constant corresponding to the ignition timing by the timing setting unit 25.

INDUSTRIAL APPLICABILITY

Since the ignition timing measuring and display device of the internal combustion engine of the present invention measures ignition timing of an internal combustion engine based on ignition noise thereof and permits the measured value to be displayed as well as ignition timing can be arbitrarily set from the outside when necessary, the device is advantageous in that ordinary users can easily carry out maintenance and the like of the internal combustion engine and an ignition device by monitoring ignition timing of the internal combustion engine to realize an operating performance of the internal combustion engine.

The invention claimed is:

1. An ignition timing measuring and display device of an internal combustion engine having a magneto, comprising:

a reference RPM signal pulse detector configured to detect a reference RPM signal pulse of the internal combustion engine; and an ignition noise pulse detector configured to detect ignition noise of an electromagnetic wave generated in the vicinity of an ignition plug when ignition is carried out in the internal combustion engine;

an arithmetic operation circuit configured to calculate ignition timing by the magneto, based on the reference RPM signal pulse detected by the RPM signal pulse detector and the ignition noise pulse detected by the ignition noise pulse detector; and a display device configured to display the ignition timing calculated by the arithmetic operation circuit.

2. The ignition timing measuring and display device of an internal combustion engine according to claim 1, wherein the reference RPM signal pulse of the internal combustion engine is a voltage pulse induced by a generator coil of the magneto.

3. The ignition timing measuring and display device of an internal combustion engine according to claim 1, wherein the reference RPM signal pulse of the internal combustion engine is a voltage pulse induced to a primary coil of an ignition coil of the magneto.

4. The ignition timing measuring and display device of an internal combustion engine according to claim 1, wherein the reference RPM signal pulse of the internal combustion engine is an output pulse of a sensor that detects RPM of the internal combustion engine.

5. The ignition timing measuring and display device of an internal combustion engine according to claim 1, wherein, in the arithmetic operation of the ignition timing, time T per reference angle is determined from a cycle T1 of the reference RPM signal pulse, and the ignition timing is determined by dividing a time T2, which passed from the time at which the signal pulse was generated to the time at which the ignition noise pulse of the electromagnetic wave was generated for the first time after the signal pulse was generated, by the time T.

6. The ignition timing measuring and display device of an internal combustion engine according to claim 1, wherein a constant corresponding to ignition timing inherent to an internal combustion engine which is different in each of work machines is set, and ignition timing determined by the arithmetic operation based on the set constant is displayed.

* * * * *